US012785301B2

(12) United States Patent
Nye et al.

(10) Patent No.: US 12,785,301 B2
(45) Date of Patent: Nov. 3, 2026

(54) ELECTRICAL CONTACT SYSTEM

(71) Applicant: THE BOEING COMPANY, Arlington, VA (US)

(72) Inventors: Robert Arthur Nye, Land O Lakes, FL (US); Shawn David Mohlman, Mill Creek, WA (US); Matthew B. Knuth, Kirkland, WA (US); Joel Douglas Johnson, Everett, WA (US); Bradley J. Mitchell, Snohomish, WA (US); Eduardo Montero-Valdez, Lynnwood, WA (US); Ryan Cole, Freeland, WA (US); Ty Aaby Larsen, Proctor, MN (US)

(73) Assignee: THE BOEING COMPANY, Arlington, VA (US)

( * ) Notice: Subject to any disclaimer, the term of this patent is extended or adjusted under 35 U.S.C. 154(b) by 828 days.

(21) Appl. No.: 18/164,793

(22) Filed: Feb. 6, 2023

(65) Prior Publication Data

US 2024/0266795 A1 Aug. 8, 2024

(51) Int. Cl.
*H01R 4/48* (2006.01)
*H01R 4/26* (2006.01)
(Continued)

(52) U.S. Cl.
CPC ............. *H01R 4/5041* (2013.01); *H01R 4/26* (2013.01); *H01R 4/489* (2013.01); *H01R 13/02* (2013.01);
(Continued)

(58) Field of Classification Search
CPC ........ H01R 4/26; H01R 4/489; H01R 4/5041; H01R 4/203; H01R 4/48185; H01R 13/02;
(Continued)

(56) References Cited

U.S. PATENT DOCUMENTS 5,033,982 A * 7/1991 Lucas .................... H01R 13/40
439/752
6,093,053 A * 7/2000 Horioka ................. H01R 4/489
439/444
(Continued)

FOREIGN PATENT DOCUMENTS

CN 111555055 B 8/2020
GB 256313 A 8/1926
JP 2008071543 A * 3/2008

OTHER PUBLICATIONS

Fouvry et al, "From fretting to connector vibration tests: a "transfer function" approach to predict electrical contact resistance endurance," ICEC 2014; The 27th International Conference on Electrical Contacts, Dresden, Germany, 2014, pp. 1-6. (Year: 2014).*
(Continued)

*Primary Examiner* — A. Dexter Tugbang
(74) *Attorney, Agent, or Firm* — Moore IP Law

(57) ABSTRACT

An electrical contact system includes a contact having a barrel with a wire entry portion having a first diameter, a clip portion having a second diameter, and a cam portion having a second diameter at a first end that tapers to a third diameter at a second end near the wire entry portion. The system also includes a clip positioned in the clip portion of the barrel, wherein ends of inwardly directed tines of the clip are configured to engage the conductor to enable the clip to be drawn onto the cam portion in response to a user pulling the wire after insertion of the conductor through the clip.

20 Claims, 5 Drawing Sheets

(51) Int. Cl.

| | |
|---|---|
| ***H01R 4/50*** | (2006.01) |
| ***H01R 13/02*** | (2006.01) |
| *H01R 13/40* | (2006.01) |
| *H01R 13/629* | (2006.01) |
| *H01R 43/027* | (2006.01) |
| *H01R 43/048* | (2006.01) |

(52) U.S. Cl.
CPC ............ *H01R 13/40* (2013.01); *H01R 13/629* (2013.01); *H01R 43/027* (2013.01); *H01R 43/0482* (2013.01); *Y10T 29/49218* (2015.01)

(58) Field of Classification Search
CPC ...... H01R 13/40; H01R 13/629; H01R 11/05; H01R 43/027; H01R 43/0482; Y10T 29/49218
See application file for complete search history.

(56) References Cited

U.S. PATENT DOCUMENTS

| | | | | |
|---|---|---|---|---|
| 2006/0160408 | A1 | 7/2006 | Quillet | |
| 2010/0048051 | A1 * | 2/2010 | Melni | H01R 4/489 29/874 |
| 2014/0150259 | A1 * | 6/2014 | Lehmann | H01R 4/203 29/857 |
| 2018/0212341 | A1 | 7/2018 | Moore et al. | |
| 2019/0067868 | A1 * | 2/2019 | Cairns | H01R 13/40 |

OTHER PUBLICATIONS

Extended European Search Report for application No. 23211965.1 dated May 14, 2024, pp. 1-12.

* cited by examiner

ELECTRICAL CONTACT SYSTEM

FIELD OF THE DISCLOSURE

The present disclosure is generally related to a wire termination system to form an electrical connection between a conductor of a wire and a contact.

BACKGROUND

Some existing means of terminating an electrical wire to a contact include the use of a crimp tool and die set that physically deforms a rear barrel of the contact to provide a mechanical and electrical connection between the contact and the wire. Crimp tools and die sets may be expensive and may require periodic calibration to remain within specified tolerances. Particularly in environments where the specified tolerances are small and required for safety and/or operational reasons, wire bundles are frequently rejected because of unreliable electrical terminations and because of contact terminations performed using out-of-tolerance crimp tools.

SUMMARY

In a particular implementation, an electrical contact system includes a contact and a clip. The contact has a barrel, wherein the barrel includes a wire entry portion having a first diameter wider than a conductor diameter of a wire, a clip portion having a second diameter, and a cam portion having the second diameter at a first end that tapers to a third diameter at a second end near the wire entry portion. The clip is positioned in the clip portion of the barrel, and the clip includes a body having a plurality of inwardly directed tines. The plurality of inwardly directed tines are biased outwards in response to passage of a conductor of the wire through the clip. Ends of the inwardly directed tines are configured to engage the conductor to enable the clip to be drawn onto the cam portion in response to a user pulling the wire after insertion of the conductor through the clip.

In another particular implementation, an electrical contact system includes a wire, a contact, and a clip. The contact has a barrel, wherein the barrel includes a wire entry portion having a first diameter wider than a conductor diameter of the wire, a clip portion having a second diameter, and a cam portion having the second diameter at a first end that tapers to a third diameter at a second end near the wire entry portion. The clip is positioned in the clip portion of the barrel, and the clip includes a body having a plurality of inwardly directed tines. The clip is initially positioned in the clip portion of the barrel, wherein the wire is positionable through the clip in a first direction to engage at least one of the plurality of inwardly directed tines of the clip with the wire. The clip is configured to be drawn on to the cam portion when the wire is pulled in a second direction to form an electrical connection between the wire, the clip, and the contact.

In another particular implementation, a method includes inserting a conductor of a wire into a barrel of a contact in a first direction to pass an end of the conductor through a clip positioned in a clip portion of the contact, wherein tines of the clip portion are biased outwards by the conductor. The method also includes pulling the wire in a second direction opposite the first direction, wherein pulling the wire causes ends of the tines to engage the conductor and draw the clip onto a cam portion of the barrel to reduce a gap of a split ring body of the clip and form an electrical connection between the wire, the clip, and the contact.

The features, functions, and advantages described herein can be achieved independently in various implementations or may be combined in yet other implementations, further details of which can be found with reference to the following description and drawings.

DETAILED DESCRIPTION

Figure 1A:
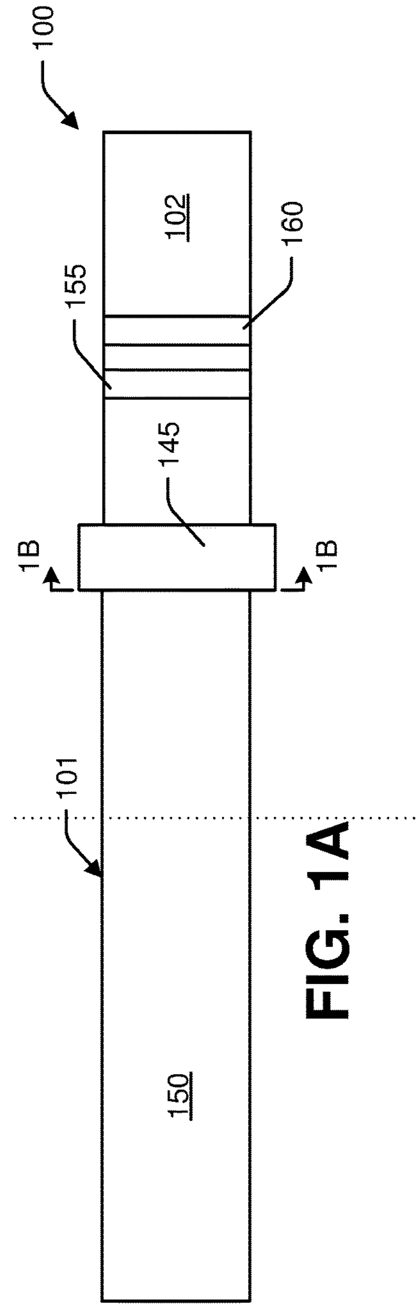
FIG. 1A depicts a plan view of an implementation of an electrical contact.

Aspects disclosed herein present systems and methods for a wire termination system using a contact that includes a barrel with a clip positioned in the barrel. In some implementations, the contact enables termination of an electrical wire by inserting a conductor of the wire into the barrel of the contact, and then pulling the wire rearwards. The clip within the barrel contacts the conductor as the wire is inserted. As the wire is pulled rearward, tines of the clip engage the conductor and cause the clip to travel with the conductor. The clip is compressed against a cam surface of the wire termination barrel to provide mechanical and electrical contact between the conductor, the clip, and the electrical contact to form a wire termination.

In some aspects, a clip is positioned in a barrel of a contact. The clip may be a metal piece configured to engage a conductor of an electrical wire and configured to compress against the conductor and a surface of the barrel to form a wire termination that establishes an electrical connection between the conductor, the clip, and the barrel. The clip can include tabs that engage the conductor of the wire, and as the wire is pulled rearward, the clip travels with the wire and is compressed by a narrowing of the barrel to form the electrical connection between the conductor, the clip, and the barrel. A technical advantage of the contact is that the contact enables simple, safe, and reliable termination of a wire to form an electrical connection between the contact and a conductor of a wire without the need for an external tool (e.g., a crimping tool) to establish the electrical connection.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIGS. 2A-2C, multiple inwardly directed tines are illustrated and associated with reference numbers 204A and 204B. When referring to a particular one of these inwardly directed tines, the distinguishing letter "A" is used. However, when referring to any arbitrary one of these inwardly directed tines or to the inwardly directed tines as a group, the reference number 204 is used without a distinguishing letter (e.g., as in FIG. 2B).

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts an electrical contact system 100 including a single contact 101. In other implementations, the electrical contact system 100 can include more than one contact 101 without departing from the scope of the subject disclosure. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1B:
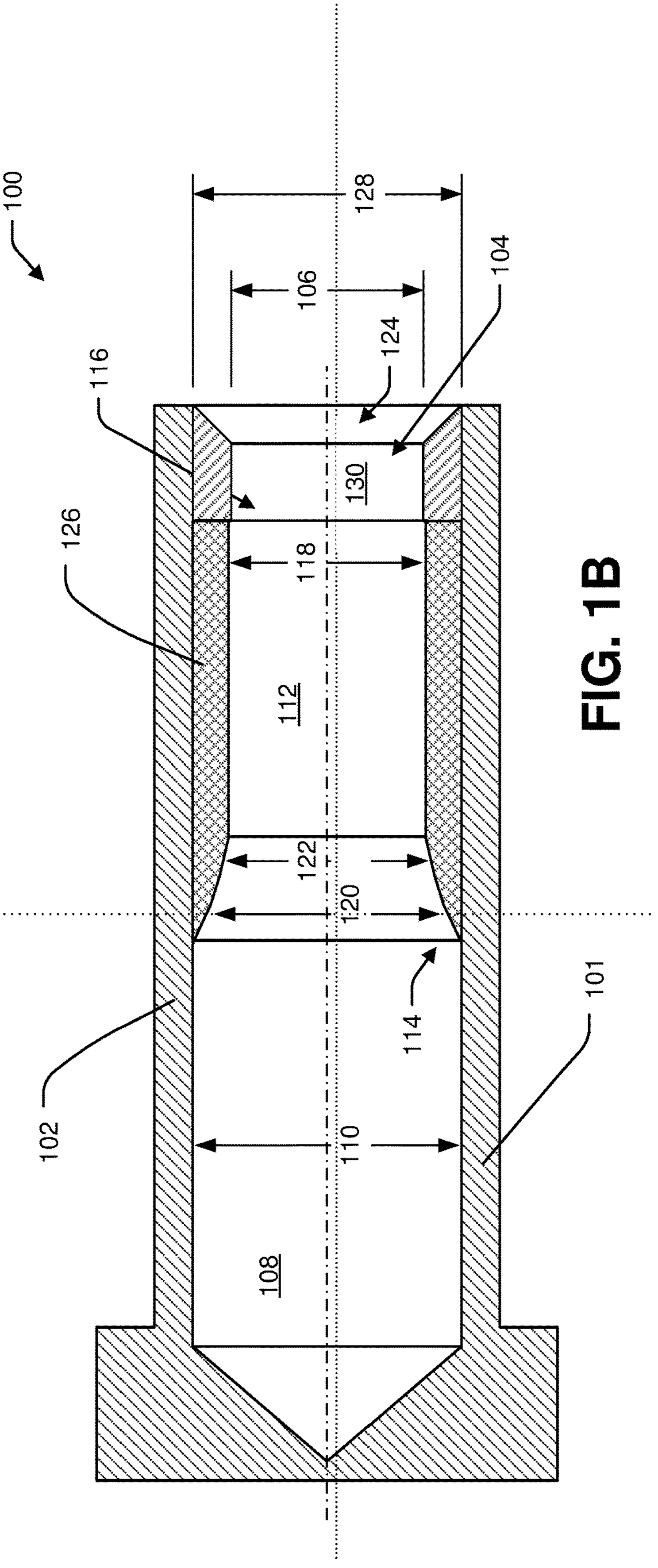
FIG. 1B depicts a cross-sectional representation of a portion of the electrical contact of FIG. 1A taken substantially along cutting plane 1B-1B of FIG. 1A.

FIG. 1A depicts an example of a contact 101 of an electrical contact system 100 in accordance with at least one implementation of the subject disclosure. In some implementations, the contact 101 includes a grip 145, a connecting end 150, a barrel 102, indicia 155, and indicia 160. In other implementations, the contact may include fewer components or additional components.

The grip 145 provides a surface that a user can hold when forming a wire termination. The connecting end 150 of the contact 101 may be a pin, prong, or some other type of connector that mates to another connector to form an electrical connection. The barrel 102 enables the contact 101 to be electrically coupled to a wire. The indicia 155, 160 may include lettering, color coding, other types of indicators, or combinations thereof, to identify a size of wire to be used with the contact 101. In other implementations, the contact 101 can include no indicia 155, 160; can include only indicia 155; or can include additional indicia in addition to indicia 155, 160.

In some implementations, the electrical contact system 100 can also include one or more clips (e.g., a clip 200 as described in more detail below with reference to FIGS. 2A-2C and 3A-3C), one or more wires (e.g., a wire 308 as described in more detail below with reference to FIGS. 3A-3C), or some combination thereof. In some aspects, the contact 101 can be sized to reduce an amount of material used to form the contact 101 while still allowing the contact 101 to withstand the forces necessary to form the wire termination. For example, the barrel 102 of the contact 101 may include an opening formed in a body of the contact. The body of the contact may be formed of a metal (e.g., aluminum or an aluminum alloy, copper or a copper alloy, etc.) and the barrel 102 may be sized to accommodate a 16-gauge wire. A thickness of the contact 101 from a surface of the barrel 102 to an outer surface of the contact 101 may be no less than approximately 0.01 inches. A cross-sectional shape of the body may be circular or may have some other cross-sectional shape (e.g., rectangular) and may include one or more barrels 102. In a particular aspect, indicia 155, 160 on an outer surface of the contact 101 indicates the particular gauge of wire. For example, lettering and/or a code may indicate that a particular contact 101 is to be used with 16-gauge wire.

In some implementations, the contact 101 includes at least one barrel 102. In some aspects, the barrel 102 can be sized for a particular gauge of wire. For example, the barrel 102 can be sized to accommodate a 16-gauge wire. In the same or alternative aspects, the barrel 102 can be sized for a class or group of wire sizes. For example, the barrel 102 can be sized to accommodate a wire that is 16-gauge or smaller. In such configurations, other modifications to the barrel 102 can be made to accommodate the different wire sizes in the class or group of wire sizes, as described in more detail below.

In some implementations, the barrel 102 can include a wire entry portion 104, a clip portion 108, and a cam portion 112. The wire entry portion 104 has a first diameter 106. The first diameter 106 is wider that a conductor diameter of a wire to be inserted into the barrel 102, as described in more detail below with reference to FIGS. 3A-3C. In a particular aspect, the first diameter 106 is less than ten millimeters wider than the conductor diameter. In the same or alternative aspects, the wire entry portion 104 is beveled to facilitate entry of the wire into the barrel 102. For example, the wire entry portion 104 can include a beveled portion 124 that tapers from a bevel diameter 128 to the first diameter 106.

In some implementations, the clip portion 108 of the barrel 102 has a second diameter 110. In some aspects, the second diameter 110 is sized to accommodate a clip inserted into the barrel 102 (e.g., the clip 200 as described in more detail below with reference to FIGS. 2A-2C and 3A-3C).

In some implementations, the cam portion 112 of the barrel 102 can have the second diameter 110 at a first end 114 that tapers to a third diameter 118 at a second end 116 near the wire entry portion 104. In some aspects, the taper of the cam portion 112 can include one or more slope portions. For example, the cam portion 112 can include a first sloped portion 120 near the clip portion 108 and one or more second sloped portions 122 along at least a portion of a length of the cam portion 112. As an additional example, the cam portion 112 can slope substantially continuously from the second diameter 110 to the third diameter 118.

In some aspects, the one or more slope portions of the cam portion 112 of the barrel 102 can be an integral part of the cam portion 112, the barrel 102, the contact 101, or some combination thereof. In the same or alternative aspects, the cam portion 112 of the barrel 102 can be an insert 126 positioned in the barrel 102 and expanded against the barrel 102 to secure the insert 126 to the barrel 102. The clip may be positioned in the clip portion 108 before the insert 126 is placed into the barrel 102 or after the insert 126 is placed in the barrel 102. In some implementations, an end piece 130 is press fit into the barrel 102. In some implementations, the end piece 130 abuts the insert 126. In other implementations, the end piece and the insert are a single piece of material. For example, a tool manufacturer or operator could create a plurality of inserts 126 designed to accommodate different wire sizes using the same size clip and, accordingly, the same size barrel 102. Such an arrangement could advantageously allow a particular tool implementing the systems described herein to be used in place of multiple current tools.

In the same or alternative aspects, the cam portion 112 of the barrel 102 can also include one or more constant diameter sections. For example, the example electrical contact system 100 illustrates the cam portion 112 including a portion that has a substantially constant diameter from the second sloped portion 122 to the second end 116 of the cam portion 112 near the wire entry portion 104. In such configurations, the cam portion 112 can taper to the third diameter 118 at the second sloped portion 122 and substantially retain the third diameter 118 to the second end 116.

In some aspects, the slopes of the one or more slope portions can be chosen such that a clip-wire combination (e.g., the wire 308 and clip 200 of FIG. 3C below) moving along the cam portion 112 can be compressed by the decreasing diameter (e.g., the change from the second diameter 110 to the third diameter 118) of the cam portion 112 such that an electrical contact is formed between the clip, the wire, and the barrel 102, as described in more detail below with reference to FIG. 3C.

For example, in order to accommodate a 16-gauge wire, the second diameter 110 of the barrel 102 can be approximately 0.073 inches and the third diameter 118 can be approximately 0.059 inches. In order to appropriately compress the clip to the wire, the cam portion 112 can taper from approximately 0.073 inches to approximately 0.059 inches. As another example to accommodate a 16-gauge wire, the second diameter 110 of the barrel 102 can be approximately 0.073 inches. The cam portion 112 can include a first sloped portion 120 with a smallest diameter of approximately 0.065 inches, and a second sloped portion 122 with a smallest diameter of approximately 0.059 inches. The second sloped portion 122 can lead to a portion of the cam portion 112 with a substantially constant diameter of approximately 0.059 inches (e.g., the third diameter 118). The values provided above are intended only as illustrative example to aid in understanding. Other values could be used without departing from the scope of the subject disclosure. For example, the cam portion 112 could be sized to accommodate a wire smaller or larger than a 16-gauge wire.

In operation, the contact 101 includes a clip portion 108 of the barrel 102 sized to accommodate a clip configured to be drawn onto the cam portion 112 of the barrel 102 in response to a user pulling a wire after insertion of the conductor through the clip, as described in more detail below with reference to FIG. 2 and FIG. 3. The clip and the wire, which can also be a part of the electrical contact system 100 (either alone or in combination), are described in more detail below with reference to FIG. 2 and FIG. 3.

Figure 2B:
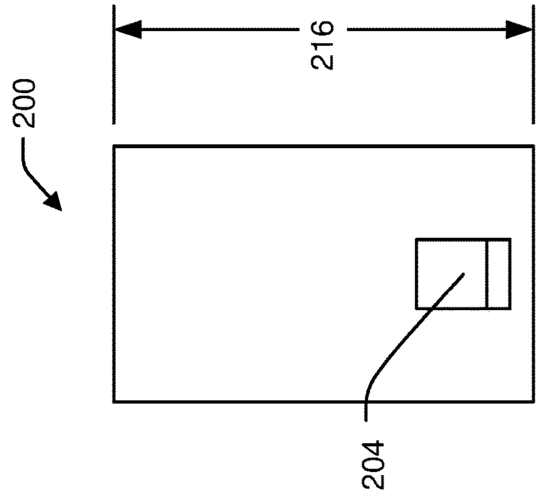
FIG. 2B illustrates a top view of the clip of FIG. 2A in accordance with at least one implementation of the subject disclosure.
Figure 2C:
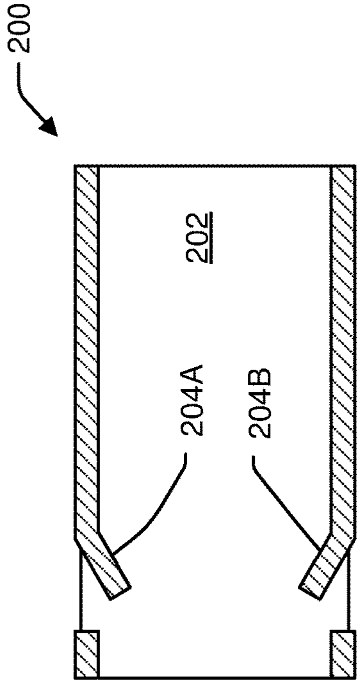
FIG. 2C illustrates a cross-sectional view of the clip of FIG. 2A taken substantially along cutting plane 2C-2C of FIG. 2A, in accordance with at least one implementation of the subject disclosure.
Figure 2A:
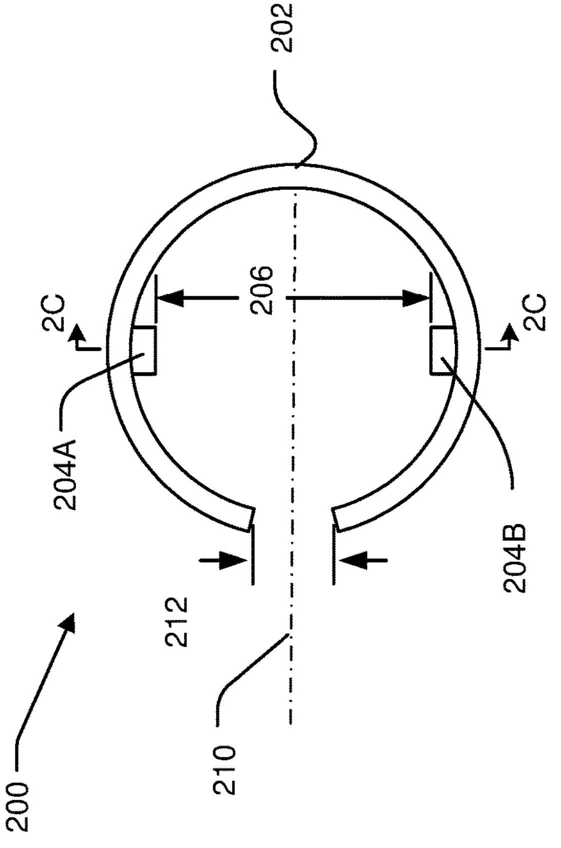
FIG. 2A illustrates a side view of a clip that can be positioned in a clip portion of a barrel of an electrical contact in accordance with at least one implementation of the subject disclosure.

FIG. 2A and FIG. 2B depict views of a clip 200. FIG. 2C depicts a cross-sectional representation of the clip 200. The clip 200 is configured to be positioned in the clip portion 108 of the barrel 102 of a contact 101. The clip 200 includes a body 202 and a plurality of inwardly directed tines 204. In some aspects, the body 202 can have a substantially cylindrical shape. In a particular aspect, the body 202 can have an outer diameter that is substantially equal or less than the second diameter 110 of FIG. 1. In some aspects, the body 202 can have an inner diameter that is slightly larger than a diameter of a conductor of a wire to be coupled to the contact 101.

In some implementations, and as depicted in FIG. 2A, the clip 200 is a split ring, where the body 202 includes a gap 212. In some aspects, the gap 212 includes a center point 210. In other implementations, the clip is a ring instead of a split ring.

In some aspects, the body 202 can have a thickness selected to minimize an amount of space the clip 200 will take up in the clip portion 108 of FIG. 1 while still accommodating the appropriate size of wire and allowing the clip 200 to withstand the forces involved during wire termination. For example, the body 202 can have a thickness of approximately 0.006 inches for an electrical contact system 100 designed to accommodate a 16-gauge wire. In the same or alternative aspects, the clip 200 can be formed of an appropriate conductive material strong enough to withstand the forces involved during wire termination while providing an appropriate electrical contact. For example, the clip 200 can be formed substantially of a beryllium copper alloy The plurality of inwardly directed tines 204A, 204B are biased outwards in response to passage of a conductor of the wire through the clip 200, as described in more detail below with reference to FIG. 3B and FIG. 3C. The ends of the inwardly directed tines 204A, 204B are configured to engage the conductor to enable the clip 200 to be drawn onto the cam portion 112 of FIG. 1 in response to a user pulling the wire after insertion of the conductor through the clip 200, as described in more detail below with reference to FIGS. 3A-3C.

In some implementations, the body 202 is a split ring to facilitate contact of the body 202 against the wire when the clip 200 is drawn on the cam portion 112 of FIG. 1.

In some implementations, at least one pair of the plurality of inwardly directed tines 204A, 204B are positioned on an interior portion of the body 202 diametrically opposite one another. In some aspects, a diameter 206 between the at least one pair of the plurality of inwardly directed tines 204A, 204B is substantially orthogonal to the center point 210 of the gap 212 in the split ring body 202 of the clip 200.

In some implementations, the slope of the inwardly directed tines 204A, 204B placed on the interior portion of the body 202 may be such that the inwardly directed tines 204A, 204B are configured to engage the conductor of the wire inserted through the clip 200 to enable the clip 200 to be drawn onto the cam portion 112 of FIG. 1 in response to a user pulling the wire after insertion of the conductor through the clip 200. In a particular aspect, the diameter 206 between the ends of the at least one pair of the plurality of inwardly directed tines 204A, 204B is approximately 0.005 inches less than the diameter of the conductor.

FIG. 2B illustrates a side view of the clip 200, in accordance with at least one implementation of the subject disclosure. FIG. 2B illustrates the clip 200 having the body 202 and a plurality of inwardly directed tines 204, one of which is illustrated. In the side view of FIG. 2B, the clip 200 has a length 216 selected to accommodate the clip 200 in the clip portion 108 of the barrel 102 of the contact 101 of FIG. 1. For example, the length 216 can have a value (e.g., 0.125 inches) substantially similar to the length of the clip portion 108 of FIG. 1.

Figures 3A, 3B:
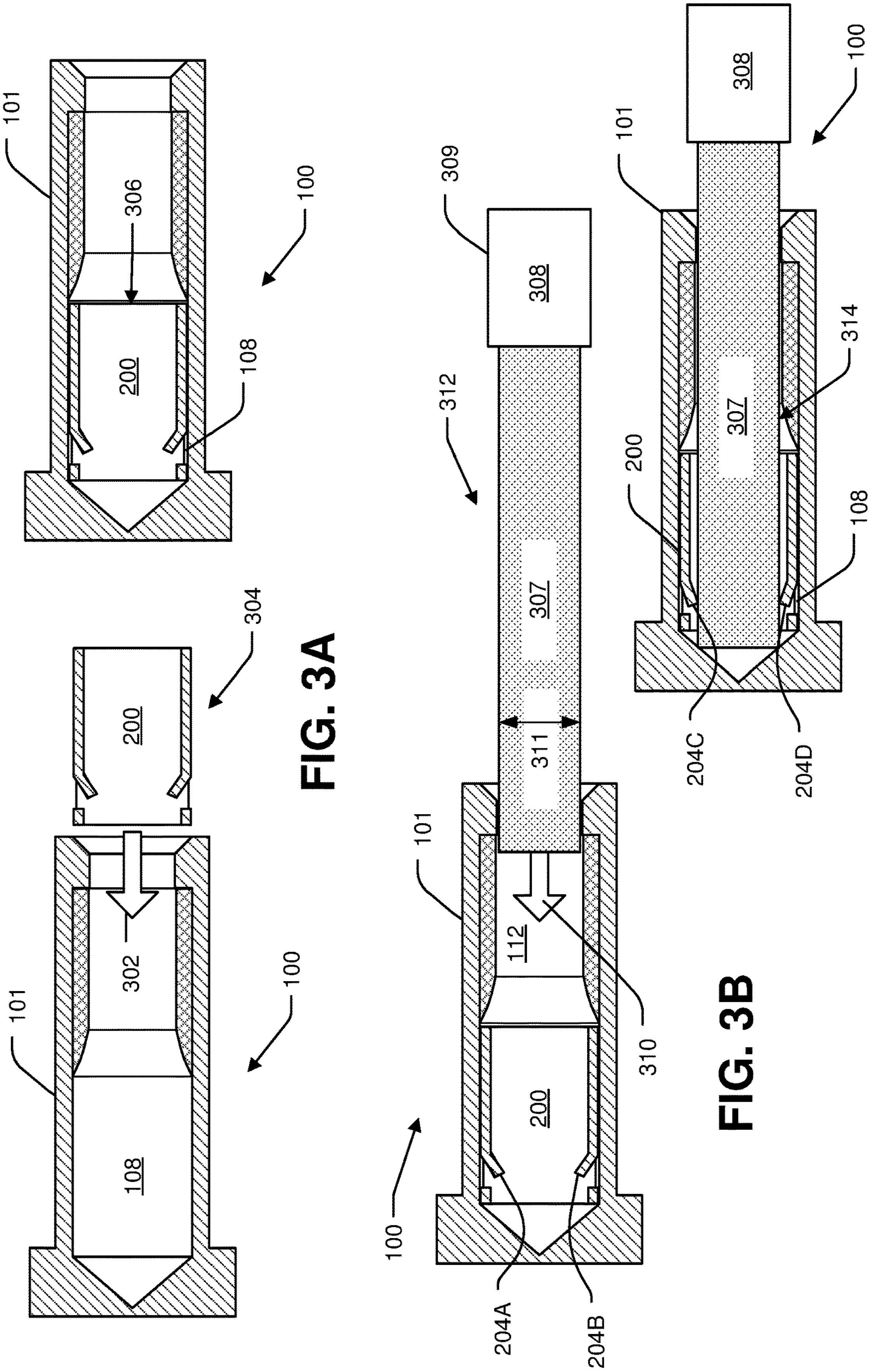
FIG. 3A illustrates an example placement of a clip into a contact in accordance with at least one implementation of the subject disclosure.
FIG. 3B illustrates an example insertion of a wire through the clip in accordance with at least one implementation of the subject disclosure.
Figure 3C:
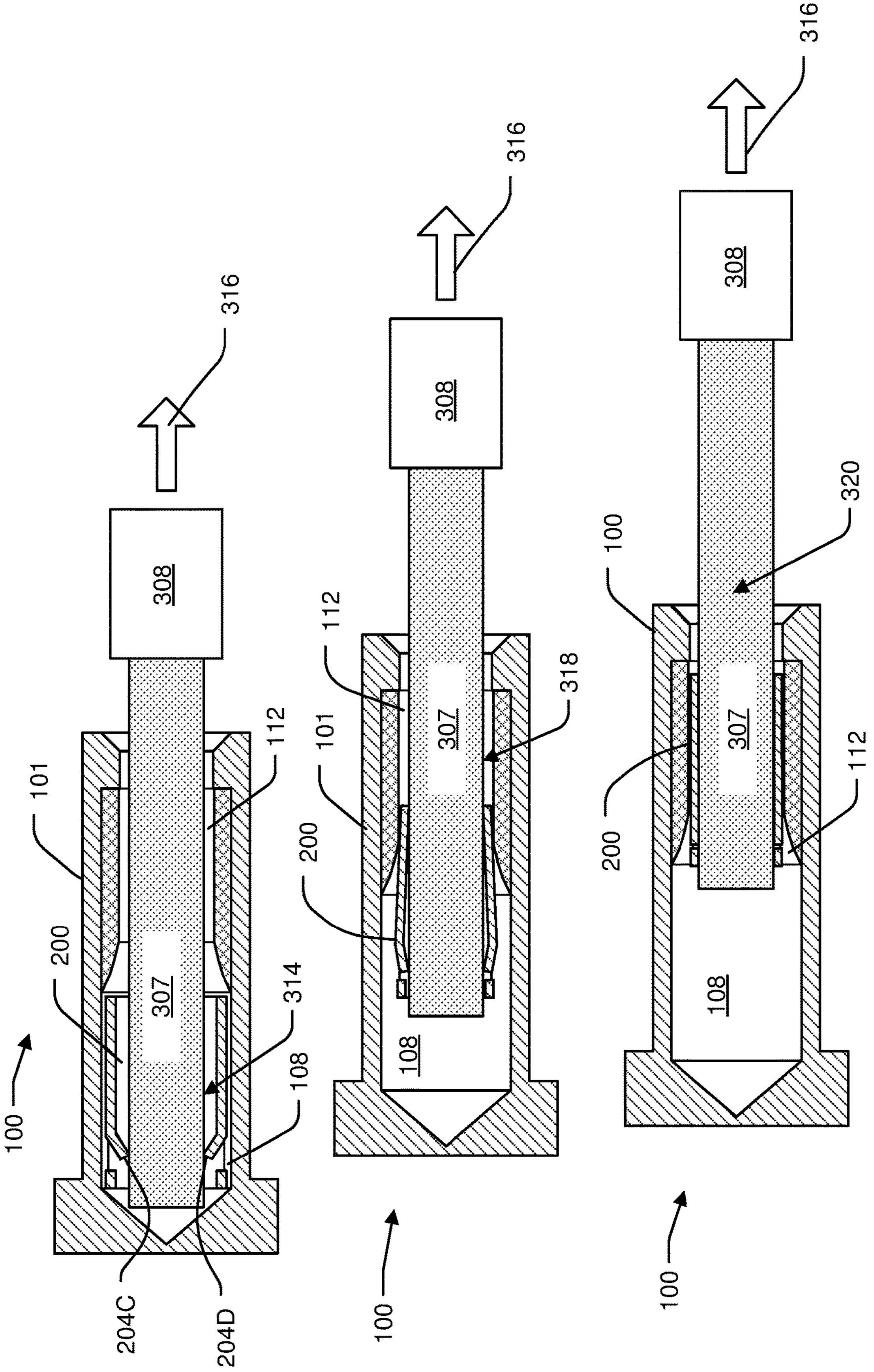
FIG. 3C illustrates an example compression of the clip around the wire to form a compression clip wire termination in accordance with at least one implementation of the subject disclosure.

FIGS. 3A-3C depict cross-sectional representations of a portion of a contact 101 during placement of a conductor 307 of a wire 308 in a barrel 102 of the contact 101 to form a wire termination. FIG. 3A illustrates an example placement of the clip 200 of FIG. 2 into the contact 101 of FIG. 1 to form some or all of the electrical contact system 100 of FIG. 1 in accordance with at least one implementation of the subject disclosure. FIG. 3A illustrates the clip 200 in a first position 304 outside the contact 101. In some implementations, the clip 200 can be positioned in a second position 306 within the clip portion 108 of the contact 101 by applying a force 302 in a direction from the wire entry portion 104 of the contact 101 toward the clip portion 108 of the contact 101. In implementations where the clip 200 is a split ring, compression of the gap 212 during insertion facilitates positioning the clip 200 into the clip portion 108 of the barrel 102. Once positioned in the clip portion 108 (e.g., at the second position 306), the clip 200 is configured to have a wire inserted through the clip 200.

In some aspects, the contact 101 can be provided to a user with the clip 200 already placed into the barrel 102 of the contact 101. In the same or alternative aspects, the contact 101 can be provided to the user along with one or more clips 200 for use in the example electrical contact system 100.

FIG. 3B illustrates an example insertion of the conductor 307 of the wire 308 through the clip 200 to form some or all of the example electrical contact system 100 in accordance with at least one implementation of the subject disclosure. The wire 308 may include the conductor 307 having a conductor diameter 311. The conductor 307 may be a braided conductor or a solid-core conductor. The wire 308 may also include insulation 309. FIG. 3B illustrates the conductor 307 in a first position 312 outside the clip 200 and positioned in the barrel 102. In some implementations, a portion of the conductor 307 can be positioned in a second position 314, with the portion of the conductor 307 through the clip 200, by applying a force in a direction 310 from the wire entry portion 104 of the contact 101 toward the clip portion 108 of the contact 101. Once positioned through the clip 200 (e.g., at the position 314), the plurality of inwardly directed tines 204 of the clip 200 are biased outwards in response to passage of the conductor 307 through the clip 200. The outwardly-biased inwardly directed tines 204 are illustrated in FIG. 3B as inwardly directed tines 204C, 204D.

As used in the subject disclosure, placing the conductor 307 "through" the clip 200 does not necessarily mean that any portion of the conductor 307 must be positioned all of the way through the clip 200 (i.e., such that a portion of the wire 308 extends beyond the clip 200 opposite the end of the clip 200 in which the wire 308 has been positioned). For the purposes of the subject disclosure, placing the conductor 307 through the clip 200 means that a portion of the conductor 307 extends past the ends of the plurality of inwardly directed tines 204 such that the inwardly directed tines 204 can engage the conductor 307 to enable the clip 200 to travel with the conductor 307 when the wire 308 is pulled to draw the clip onto the cam portion 112 of FIG. 1, as described in more detail below.

FIG. 3C illustrates an example compression of the clip 200 around the wire 308 to form a compression clip wire termination in accordance with at least one implementation of the subject disclosure. FIG. 3C illustrates the wire 308 in a position 314 where a portion of the conductor 307 is through the clip 200 such that the ends of the inwardly directed tines 204C, 204D are biased outwards. The ends of the inwardly directed tines 204C, 204D are configured to engage the conductor 307 to enable the clip 200 to be drawn onto the cam portion 112 of the contact 101.

In some implementations, the combination of the clip 200 and the conductor 307 can be moved to position 318 by the application of the force 316 to the wire 308. In the position 318, a portion of the clip 200 begins to compress around the wire 308 as the clip 200 enters the cam portion 112 of the contact 101. As described in more detail above with reference to FIG. 1, the cam portion 112 of the contact 101 tapers from a second diameter 110 of the clip portion 108 to a third diameter 118 at a second end near the wire entry portion 104. The force 316 causes a portion of the combination of the clip 200 and the conductor 307 to enter the cam portion 112, which compresses the clip 200 around the conductor 307 and causes a portion of the conductor 307 to be in contact with the cam portion 112. In a particular aspect, compression of the clip 200 results in a reduction of the gap 212 of FIG. 2 in the body 202 of the clip 200 when the clip 200 is a split ring.

In some implementations, the combination of the clip 200 and the conductor 307 can be further moved to position 320 by the application of the force 316. In the position 320, the combination of the clip 200 and the conductor 307 have moved more fully into the cam portion 112 of the contact 101 such that the clip 200 is compressed around the wire 308 sufficient to form an electrical contact between the clip 200, the conductor 307, and the contact 101, which completes the wire termination for the wire 308.

As described in more detail above with reference to FIGS. 1-3, the electrical contact system 100 can include one or more of the contact 101 of FIG. 1, the clip 200 of FIG. 2, the wire 308 of FIG. 3, or an appropriate combination thereof. For example, in some implementations the electrical contact system 100 can include the contact 101 of FIG. 1 and the clip 200 of FIG. 2.

As an additional example, in some implementations the electrical contact system 100 can include the wire 308 of FIG. 3, the contact 101 of FIG. 1, and the clip 200 of FIG. 2 positioned in the barrel 102 of the contact 101, where the clip 200 includes a body 202 having a plurality of inwardly directed tines 204, where the clip 200 is initially positioned in the second position 306 in the clip portion 108 of the barrel 102, where the conductor 307 of the wire 308 is positionable through the clip 200 in a first direction 310 to engage at least one of the plurality of inwardly directed tines 204 of the clip 200 with the conductor 307 by pushing the conductor 307 into the barrel of the contact 101, and where the clip 200 is configured to be drawn onto the cam portion 112 of the contact 101 when the wire 308 is pulled by the force 316 in a second direction to form an electrical connection between the conductor 307, the clip 200, and the contact 101 that thereby completes the wire termination for the wire 308.

Figure 4:
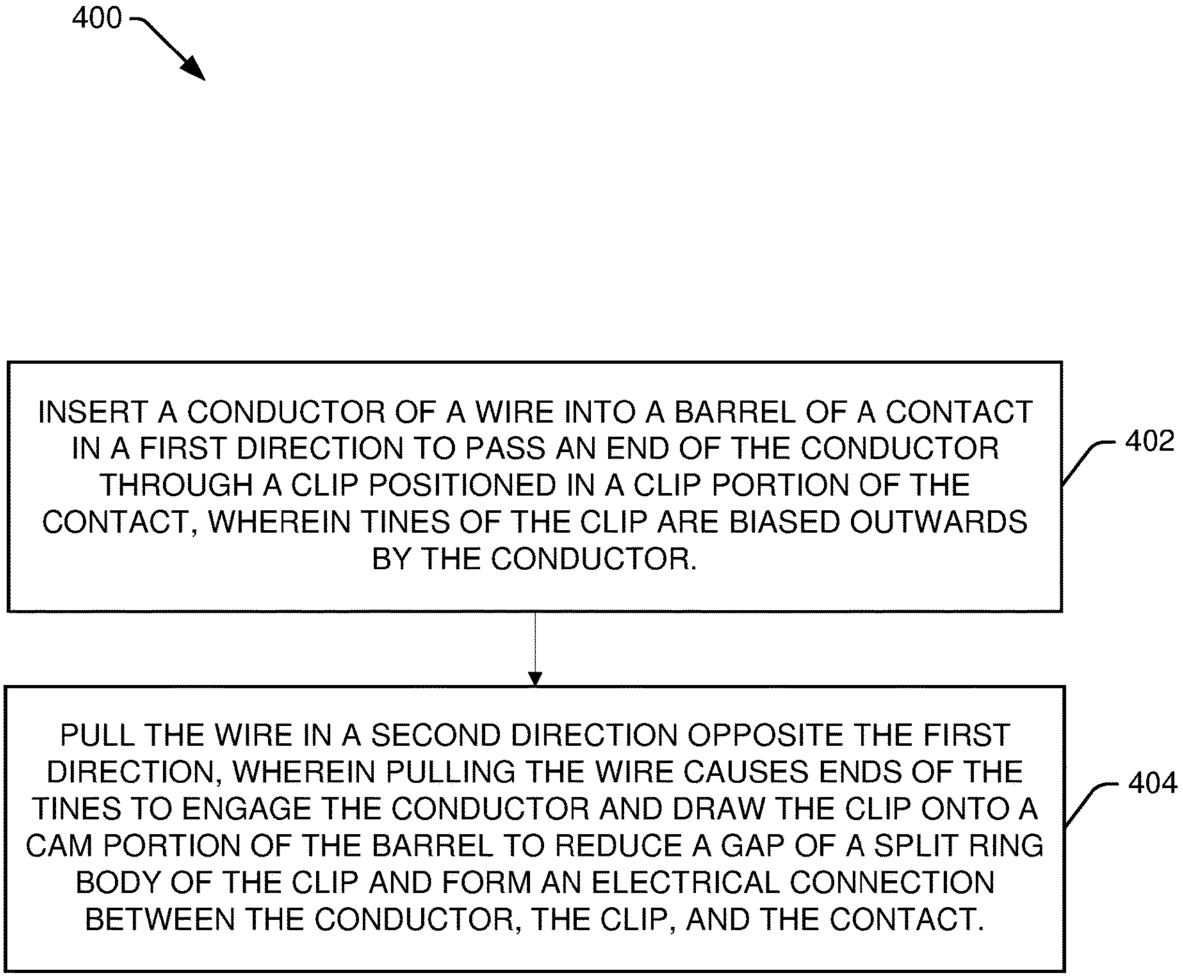
FIG. 4 is a flow chart of an example method for providing a compression clip wire termination system, in accordance with the subject disclosure.

FIG. 4 is a flow chart of an example method 400 for providing wire termination, in accordance with the subject disclosure.

In some implementations, the method 400 can include, at block 402, inserting a conductor of a wire into a barrel of a contact in a first direction to pass an end of the conductor through a clip positioned in a clip portion of the contact, wherein tines of the clip portion are biased outwards by the conductor. For example, a user could insert a wire 308 of FIG. 3 into a barrel 102 of FIG. 1 of a contact 101 of a connector in a first direction 310 to pass an end of the wire 308 through the clip 200 of FIG. 2 positioned in a clip portion 108 of the connector, wherein tines 204 of the clip 200 are biased outwards by the conductor 307.

The method 400 can also include, at block 404, pulling the wire in a second direction opposite the first direction, wherein pulling the wire causes ends of the tines to engage the conductor and draw the clip onto a cam portion of the barrel to reduce a gap of a split ring body of the clip and form an electrical connection between the wire, the clip, and the contact. For example, the user could pull the wire 308 of FIG. 3 with the force 316 in a second direction opposite the first direction 310, wherein pulling the wire 308 causes ends of the tines 204 of FIG. 2 to engage the conductor 307 and draw the clip 200 onto a cam portion 112 of FIG. 1 of the barrel 102 to reduce a gap 212 of the body 202 of the clip 200 and form an electrical connection between the wire 308, the clip 200, and the contact 101.

Although the method 400 is illustrated as including a certain number of steps, more, fewer, and/or different steps can be included in the method 400 without departing from the scope of the subject disclosure. For example, contact 101 can be manufactured and shipped to a user with the clip 200 already placed within the barrel 102 of the contact 101.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

According to Clause 1, an electrical contact system includes a contact. The contact has a barrel, wherein the barrel comprises a wire entry portion having a first diameter wider than a conductor diameter of a wire, a clip portion having a second diameter, and a cam portion having the second diameter at a first end that tapers to a third diameter at a second end near the wire entry portion. The electrical contact system also includes a clip positioned in the clip portion of the barrel, wherein the clip comprises a body having a plurality of inwardly directed tines, wherein the plurality of inwardly directed tines are biased outwards in response to passage of a conductor of the wire through the clip, and wherein ends of the inwardly directed tines are configured to engage the conductor to enable the clip to be drawn onto the cam portion in response to a user pulling the wire after insertion of the conductor through the clip.

Clause 2 includes the electrical contact system of Clause 1, wherein the first diameter is less than ten millimeters wider than the conductor diameter.

Clause 3 includes the electrical contact system of Clause 1 or Clause 2, wherein the body is a split ring to facilitate contact of the body against the conductor when the clip is drawn onto the cam portion.

Clause 4 includes the electrical contact system of any of Clauses 1-3, wherein at least one pair of the plurality of inwardly directed tines are placed on an interior portion of the body diametrically opposite one another.

Clause 5 includes the electrical contact system of Clause 4, wherein a distance between the ends of the at least one pair of the plurality of inwardly directed tines is approximately 0.005 inches less than a minimum conductor diameter of the wire.

Clause 6 includes the electrical contact system of Clause 4 or Clause 5, wherein the body is a split ring to facilitate contact of the body against the conductor when the clip is drawn onto the cam portion, and wherein a diameter between the at least one pair of the plurality of inwardly directed tines is substantially orthogonal to a center point of a gap in the split ring.

Clause 7 includes the electrical contact system of any of Clauses 1-6, wherein a thickness of the contact from a surface of the barrel to an outer surface of the contact is no less than approximately 0.01 inches.

Clause 8 includes the electrical contact system of any of Clauses 1-7, wherein a thickness of the body is approximately 0.006 inches.

Clause 9 includes the electrical contact system of any of Clauses 1-8, wherein the taper of the cam portion has a first slope near the clip portion and one or more second slopes along at least a portion of a length of the cam portion.

Clause 10 includes the electrical contact system of any of Clauses 1-9, wherein the cam portion includes one or more constant diameter sections.

Clause 11 includes the electrical contact system of any of Clauses 1-10, wherein the wire entry portion is beveled to facilitate entry of the wire into the barrel.

Clause 12 includes the electrical contact system of any of Clauses 1-11, wherein the cam portion is an insert positioned in the barrel.

Clause 13 includes the electrical contact system of any of Clauses 1-12, wherein the barrel is sized for a particular gauge of wire.

Clause 14 includes the electrical contact system of Clause 13, wherein indicia on an outer surface of the contact indicates the particular gauge of wire.

Clause 15 includes the electrical contact system of Clause 13 or Clause 14, wherein the particular gauge of wire is sixteen gauge or smaller.

Clause 16 includes the electrical contact system of claim 1, wherein the clip comprises beryllium copper.

According to Clause 17, an electrical contact system includes a wire, a contact, and a clip. The contact has a barrel, wherein the barrel comprises a wire entry portion having a first diameter wider than a conductor diameter of the wire, a clip portion having a second diameter, and a cam portion having the second diameter at a first end that tapers to a third diameter at a second end near the wire entry portion. The clip is positioned in the barrel, wherein the clip comprises a body having a plurality of inwardly directed tines, wherein the clip is initially positioned in the clip portion of the barrel, wherein the wire is positionable through the clip in a first direction to engage at least one of the plurality of inwardly directed tines of the clip with the wire, and wherein the clip is configured to be drawn onto the cam portion when the wire is pulled in a second direction to form an electrical connection between the wire, the clip, and the contact.

Clause 18 includes the electrical contact system of Clause 17, wherein the first diameter is less than ten millimeters wider than the conductor diameter.

Clause 19 includes the electrical contact system of Clause 17 or Clause 18, wherein the body is a split ring to facilitate contact of the body against the conductor when the clip is drawn onto the cam portion.

Clause 20 includes the electrical contact system of any of Clauses 17-19, wherein at least one pair of the plurality of inwardly directed tines are placed on an interior portion of the body diametrically opposite one another.

Clause 21 includes the electrical contact system of Clause 20, wherein a distance between ends of the at least one pair of the plurality of inwardly directed tines is approximately 0.005 inches less than a minimum conductor diameter of the wire.

Clause 22 includes the electrical contact system of Clause 20 or Clause 21, wherein the body is a split ring to facilitate contact of the body against the conductor when the clip is drawn onto the cam portion, and wherein a diameter between the at least one pair of the plurality of inwardly directed tines is substantially orthogonal to a center point of a gap in the split ring.

Clause 23 includes the electrical contact system of any of Clauses 17-22, wherein a thickness of the contact from a surface of the barrel to an outer surface of the contact is no less than approximately 0.01 inches.

Clause 24 includes the electrical contact system of any of Clauses 17-23, wherein a thickness of the body is approximately 0.006 inches.

Clause 25 includes the electrical contact system of any of Clauses 17-24, wherein the taper of the cam portion has a first slope near the clip portion and one or more second slopes along at least a portion of a length of the cam portion.

Clause 26 includes the electrical contact system of any of Clauses 17-25, wherein the cam portion includes one or more constant diameter sections.

Clause 27 includes the electrical contact system of any of Clauses 17-27, wherein the wire entry portion is beveled to facilitate entry of the wire into the barrel.

Clause 28 includes the electrical contact system of any of Clauses 17-27, wherein the cam portion is an insert positioned in the barrel.

Clause 29 includes the electrical contact system of any of Clauses 17-28, wherein the barrel is sized for a particular gauge of wire.

Clause 30 includes the electrical contact system of Clause 29, wherein indicia on an outer surface of the contact indicates the particular gauge of wire.

Clause 31 includes the electrical contact system of Clause 29 or Clause 30, wherein the particular gauge of wire is sixteen gauge or smaller.

Clause 32 includes the electrical contact system of any of Clauses 17-31, wherein the clip comprises beryllium copper.

According to Clause 33, a method includes inserting a conductor of a wire into a barrel of a contact in a first direction to pass an end of the conductor through a clip positioned in a clip portion of the contact, wherein tines of the clip are biased outwards by the conductor. The method also includes pulling the wire in a second direction opposite the first direction, wherein pulling the wire causes ends of the tines to engage the conductor and draw the clip onto a cam portion of the barrel to reduce a gap of a split ring body of the clip and form an electrical connection between the wire, the clip, and the contact.

Clause 34 includes the method of Clause 33, wherein the pulling the wire reduces a gap of a split ring body of the clip.

Clause 35 includes the method of Clause 33 or Clause 34, wherein the wire and the clip are substantially fixed relative to the barrel following formation of the electrical connection.

Clause 36 includes the method of any of Clauses 33-35, wherein a thickness of the contact from a surface of the barrel to an outer surface of the contact is no less than approximately 0.01 inches.

Clause 37 includes the method of any of Clauses 33-36, wherein a thickness of the split ring body is approximately 0.006 inches.

Clause 38 includes the method of any of Clauses 33-37, wherein the cam portion includes one or more constant diameter sections.

Clause 39 includes the method of any of Clauses 33-38, wherein the cam portion is an insert positioned in the barrel.

Clause 40 includes the method of any of Clauses 33-39, wherein the barrel is sized for a particular gauge of wire.

Clause 41 includes the method of Clause 40, wherein indicia on an outer surface of the contact indicates the particular gauge of wire.

Clause 42 includes the method of Clause 40 or Clause 41, wherein the particular gauge of wire is sixteen gauge or smaller.

Clause 43 includes the method of any of Clauses 33-42, wherein the clip comprises beryllium copper.

What is claimed is:

1. An electrical contact system comprising:

a contact having a barrel, wherein the barrel comprises a wire entry portion having a first diameter wider than a conductor diameter of a wire, a clip portion having a second diameter, and a cam portion having the second diameter at a first end that tapers to a third diameter at a second end near the wire entry portion; and a clip positioned in the clip portion of the barrel, wherein the clip comprises a body having a plurality of inwardly directed tines, wherein the plurality of inwardly directed tines are biased outwards in response to passage of a conductor of the wire through the clip, wherein ends of the inwardly directed tines are configured to engage the conductor to enable the clip to be drawn onto the cam portion in response to a user pulling the wire after insertion of the conductor through the clip, and wherein the body is a split ring to facilitate contact of the body against the conductor when the clip is drawn onto the cam portion.

2. The electrical contact system of claim 1, wherein the first diameter is less than ten millimeters wider than the conductor diameter.

3. The electrical contact system of claim 1, wherein at least one pair of the plurality of inwardly directed tines are placed on an interior portion of the body diametrically opposite one another.

4. The electrical contact system of claim 3, wherein a distance between ends of the at least one pair of the plurality of inwardly directed tines is approximately 0.005 inches less than the conductor diameter of the wire.

5. The electrical contact system of claim 3, wherein a diameter between the at least one pair of the plurality of inwardly directed tines is substantially orthogonal to a center point of a gap in the split ring.

6. The electrical contact system of claim 1, wherein a thickness of the contact from a surface of the barrel to an outer surface of the contact is no less than approximately 0.01 inches.

7. The electrical contact system of claim 1, wherein a thickness of the body is approximately 0.006 inches.

8. The electrical contact system of claim 1, wherein a taper of the cam portion has a first slope near the clip portion and one or more second slopes along at least a portion of a length of the cam portion.

9. The electrical contact system of claim 1, wherein the cam portion includes one or more constant diameter sections.

10. The electrical contact system of claim 1, wherein the wire entry portion is beveled to facilitate entry of the wire into the barrel.

11. The electrical contact system of claim 1, wherein the cam portion is an insert positioned in the barrel.

12. The electrical contact system of claim 1, wherein the barrel is sized for a particular gauge of the wire.

13. The electrical contact system of claim 12, wherein indicia on an outer surface of the contact indicates the particular gauge of the wire.

14. The electrical contact system of claim 12, wherein the particular gauge of the wire is sixteen gauge or smaller.

15. The electrical contact system of claim 1, wherein the clip comprises beryllium copper.

16. An electrical contact system comprising:

a wire including a conductor;

a contact having a barrel, wherein the barrel comprises a wire entry portion having a first diameter wider than a conductor diameter of the wire, a clip portion having a second diameter, and a cam portion having the second diameter at a first end that tapers to a third diameter at a second end near the wire entry portion, and wherein the cam portion is an insert positioned in the barrel; and a clip positioned in the barrel, wherein the clip comprises a body having a plurality of inwardly directed tines, wherein the clip is initially positioned in the clip portion of the barrel, wherein the wire is positionable through the clip in a first direction to engage at least one of the plurality of inwardly directed tines of the clip with the wire, wherein the clip is configured to be drawn onto the cam portion when the wire is pulled in a second direction to form an electrical connection between the wire, the clip, and the contact.

17. The electrical contact system of claim 16, wherein:

at least one pair of the plurality of inwardly directed tines are placed on an interior portion of the body diametrically opposite one another;

the body is a split ring to facilitate contact of the body against the conductor when the clip is drawn onto the cam portion, and wherein a diameter between the at least one pair of the plurality of inwardly directed tines is substantially orthogonal to a center point of a gap in the split ring; and the diameter between ends of the at least one pair of the plurality of inwardly directed tines is approximately 0.005 inches less than a minimum conductor diameter of the wire.

18. The electrical contact system of claim 16, wherein a taper of the cam portion has a first slope near the clip portion and one or more second slopes along at least a portion of a length of the cam portion.

19. An electrical contact system comprising:

a contact having a barrel, wherein the barrel comprises a wire entry portion having a first diameter wider than a conductor diameter of a wire, a clip portion having a second diameter, and a cam portion having the second diameter at a first end that tapers to a third diameter at a second end near the wire entry portion, and wherein a taper of the cam portion has a first slope near the clip portion and one or more second slopes along at least a portion of a length of the cam portion; and a clip positioned in the clip portion of the barrel, wherein the clip comprises a body having a plurality of inwardly directed tines, wherein the plurality of inwardly directed tines are biased outwards in response to passage of a conductor of the wire through the clip, wherein ends of the inwardly directed tines are configured to engage the conductor to enable the clip to be drawn onto the cam portion in response to a user pulling the wire after insertion of the conductor through the clip.

20. The electrical contact system of claim 19, wherein the cam portion is an insert positioned in the barrel.

* * * * *